US012567338B1

(12) United States Patent
Williams

(10) Patent No.: US 12,567,338 B1
(45) Date of Patent: Mar. 3, 2026

(54) ELECTRONIC EDUCATION AND DRAWING PAD DEVICE

(71) Applicant: Idaliana Williams, Villa Rica, GA (US)

(72) Inventor: Idaliana Williams, Villa Rica, GA (US)

( * ) Notice: Subject to any disclaimer, the term of this patent is extended or adjusted under 35 U.S.C. 154(b) by 0 days.

(21) Appl. No.: 18/921,932

(22) Filed: Oct. 21, 2024

(51) Int. Cl.
G09B 1/32 (2006.01)
G06F 1/16 (2006.01)
G06F 3/0354 (2013.01)
G06F 3/041 (2006.01)
G06F 3/04883 (2022.01)
G06F 3/16 (2006.01)

(52) U.S. Cl.
CPC ........... *G09B 1/325* (2013.01); *G06F 1/1633* (2013.01); *G06F 3/03545* (2013.01); *G06F 3/0412* (2013.01); *G06F 3/04883* (2013.01); *G06F 3/16* (2013.01)

(58) Field of Classification Search
CPC ... G09B 1/325; G06F 1/1633; G06F 3/03545; G06F 3/0412; G06F 3/04883; G06F 3/16
See application file for complete search history.

(56) References Cited

U.S. PATENT DOCUMENTS

| | | | |
|---|---|---|---|
| 5,813,861 A | 9/1998 | Wood | |
| 6,405,167 B1 | 6/2002 | Cogliano | |
| 6,882,824 B2 | 4/2005 | Wood | |
| 8,025,504 B2 | 9/2011 | Freeman | |
| 9,870,714 B2 | 1/2018 | Potts | |
| 2005/0175970 A1 | 8/2005 | Dunlap | |
| 2017/0069221 A1* | 3/2017 | Potts | G09B 5/125 |

* cited by examiner

*Primary Examiner* — Yaron Cohen

(57) ABSTRACT

An electronic education and drawing pad device includes a housing and a touch screen display disposed on the housing and a stylus. A processor is integrated into the housing and a speaker is integrated into the housing. A game button, a music button, a story button, a drawing button and a language button is each disposed on the housing. The touch screen display is responsive to contact with the stylus to enable a child to create the drawings on the touch screen display when the drawing button is pressed. The touch screen display displays a game when the game button is pressed. The speaker emits spoken words of a language when the language button is pressed to enable the child to learn a spoken language. The speaker emits a story when the story button is pressed and the speaker emits music when the music button is pressed.

17 Claims, 6 Drawing Sheets

ELECTRONIC EDUCATION AND DRAWING PAD DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to education and drawing pad devices and more particularly pertains to a new education and drawing pad device for enabling a child to create drawings with a stylus. The drawing pad device includes a housing and a touch screen display attached to the housing and a stylus that can be employed for creating drawings on the touch screen display. The device includes a processor integrated into the housing which includes a speaker for emitting audible sounds. The processor includes a game button and a story button and a drawing button and a music button and a language button. The touch screen display is actuated to display a game when the game button is pressed, the speaker emits music when the music button is pressed and the speaker emits a story when the story button is pressed. Additionally, the speaker emits words of a foreign language when the language button is pressed to enable the child to learn the foreign language.

(2) Description of Related Art Including Information Disclosed Under 37 CFR 1.97 and 1.98

The prior art relates to education and drawing pad devices including: an interactive learning device that includes keys in the form of raised letters and a speaker and card slot for insertably receiving data cards; an electronic interactive book device that includes a book and a display integrated into the book and a microphone for recognizing words spoken by a child to teach pronunciation of words; an educational toy that includes a housing shaped like an animal and a keypad integrated into the housing and a speaker for emitting spelling instructions; an interactive teaching device that includes a housing and a touch screen attached to the housing and a stylus for practicing various forms of writing on the touch screen. In no instance does the prior art disclose an electronic education and drawing pad device that includes a housing and a touch screen display integrated into the housing and a stylus for creating drawings on the touch screen and a speaker and a game button for playing games on the touch screen display and a story button for emitting stories from the speaker and a language button for teaching a foreign language.

BRIEF SUMMARY OF THE INVENTION

An embodiment of the disclosure meets the needs presented above by generally comprising a housing and a touch screen display disposed on the housing and a stylus. A processor is integrated into the housing and a speaker is integrated into the housing. A game button, a music button, a story button, a drawing button and a language button is each disposed on the housing. The touch screen display is responsive to contact with the stylus to enable a child to create the drawings on the touch screen display when the drawing button is pressed. The touch screen display displays a game when the game button is pressed. The speaker emits spoken words of a language when the language button is pressed to enable the child to learn a spoken language. The speaker emits a story when the story button is pressed and the speaker emits music when the music button is pressed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
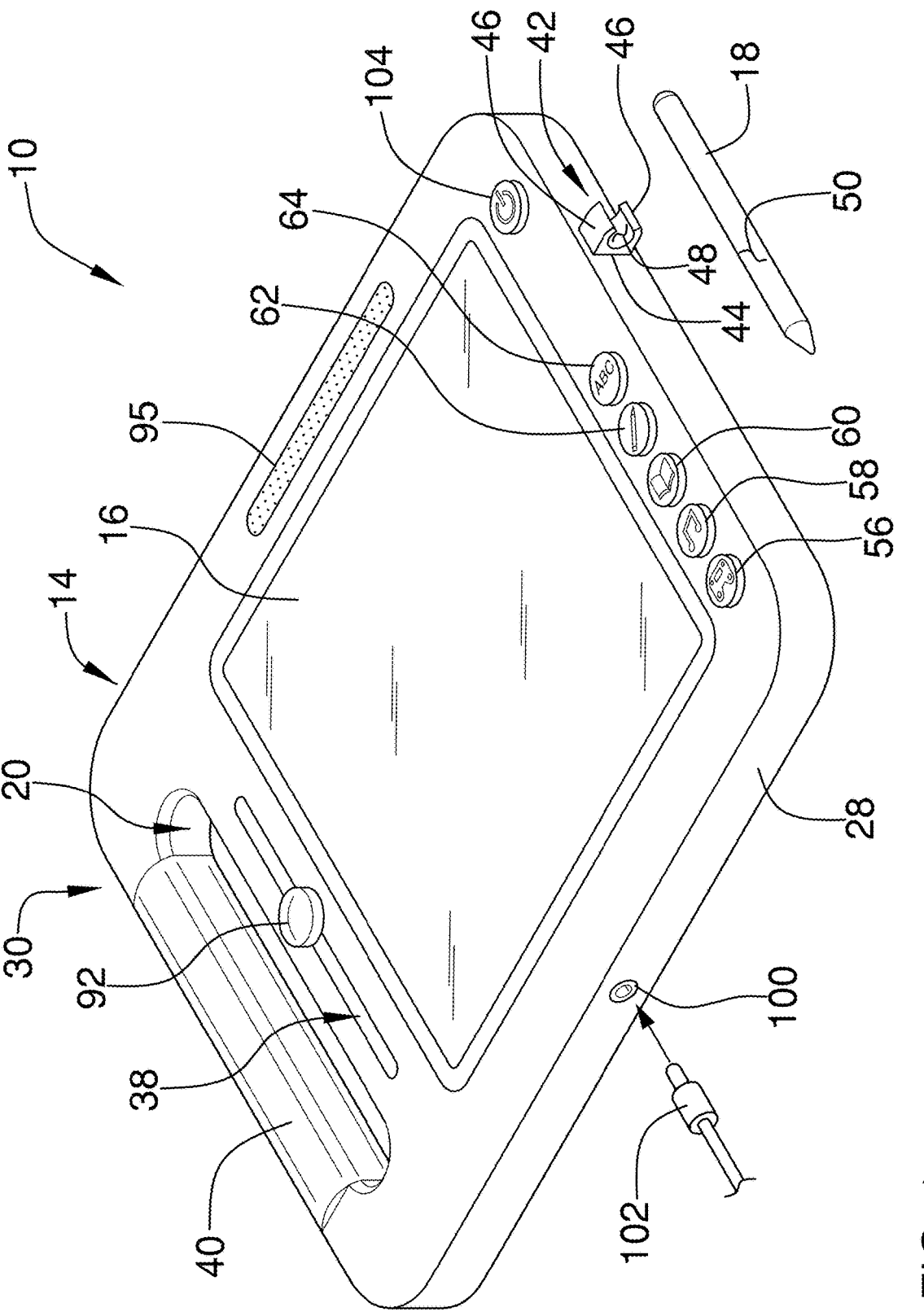
FIG. 1 is a top perspective view of an electronic education and drawing pad device according to an embodiment of the disclosure.
Figure 2:
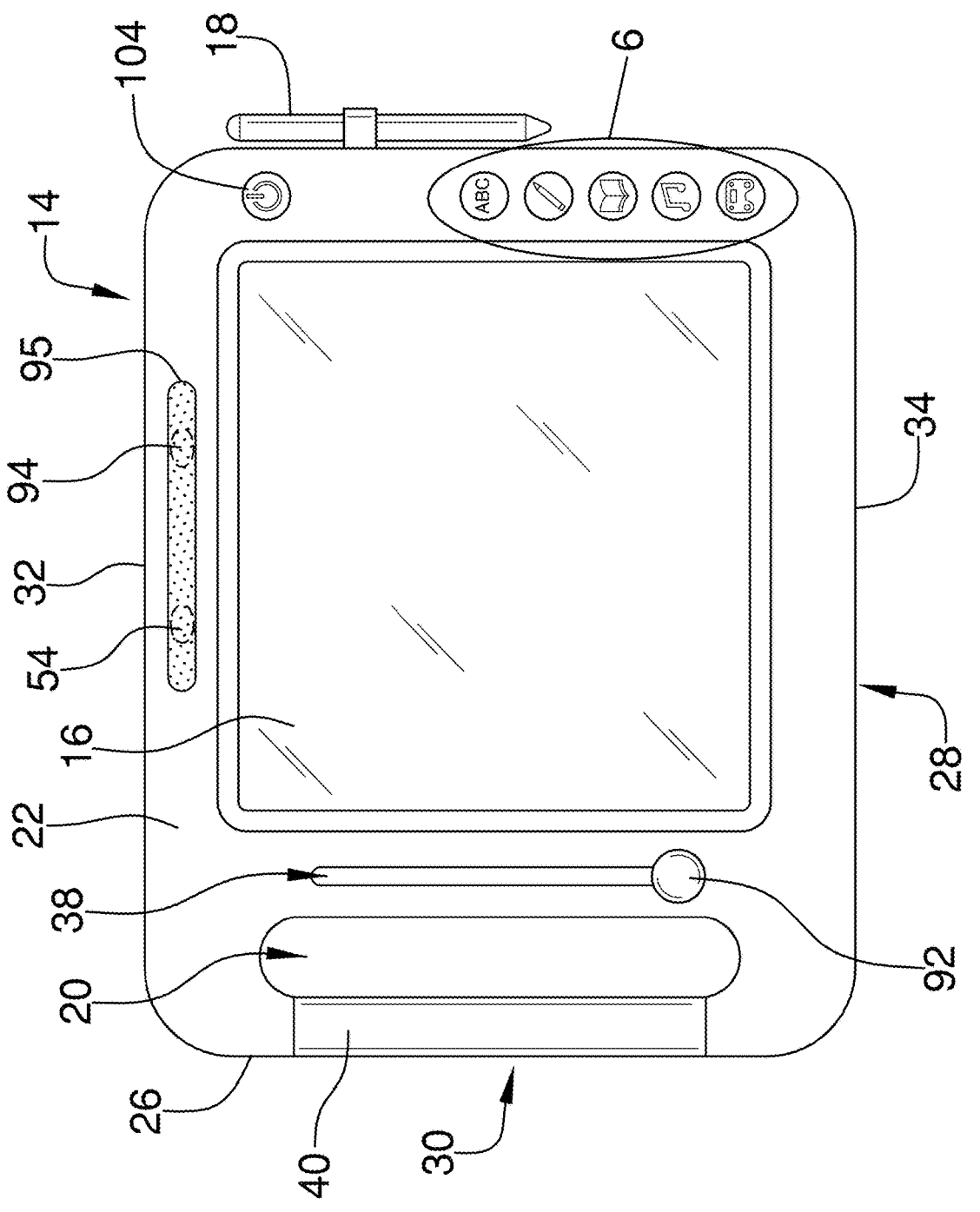
FIG. 2 is a top view of an embodiment of the disclosure.
Figure 3:
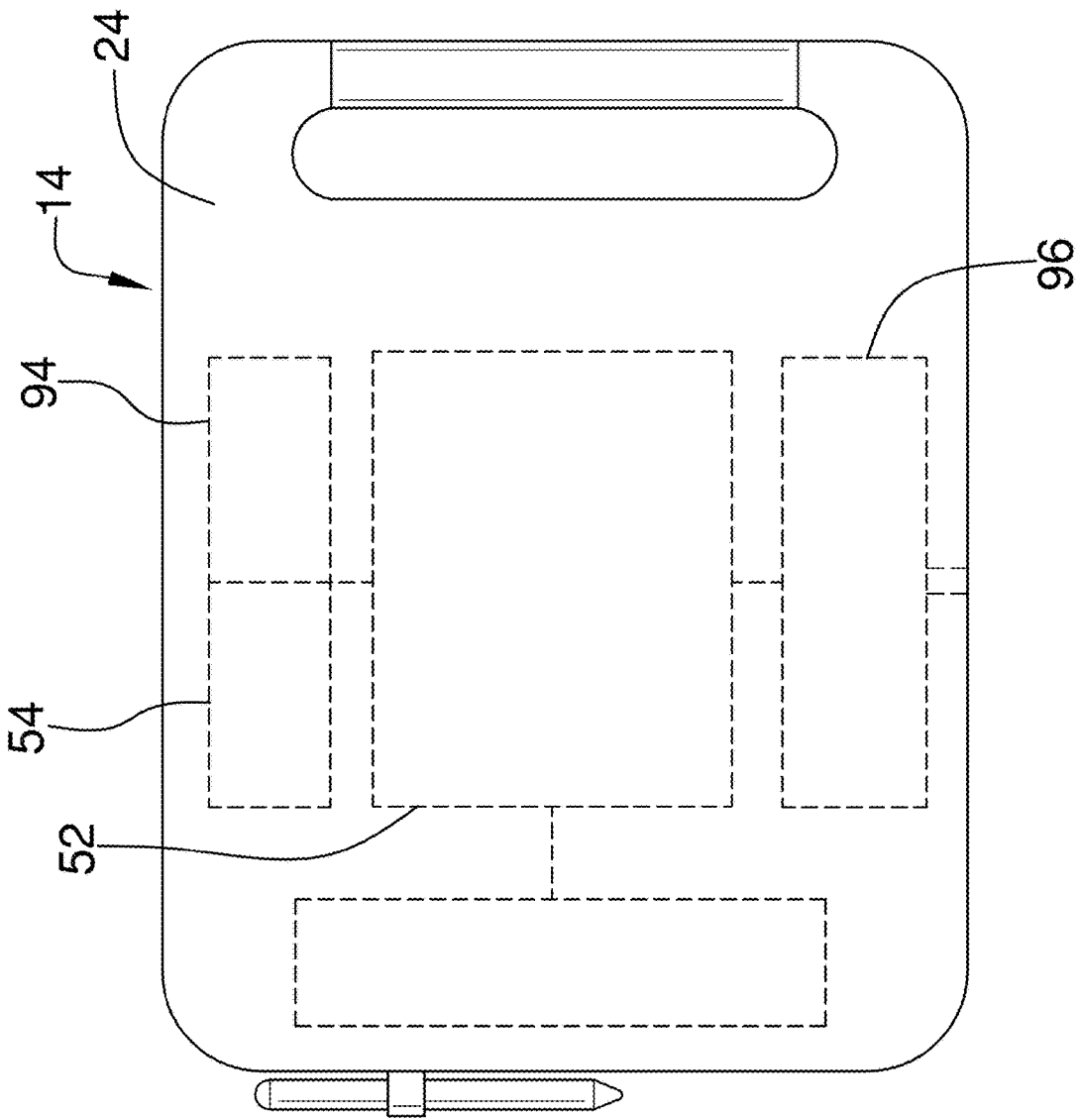
FIG. 3 is a back phantom view of an embodiment of the disclosure.
Figure 4:
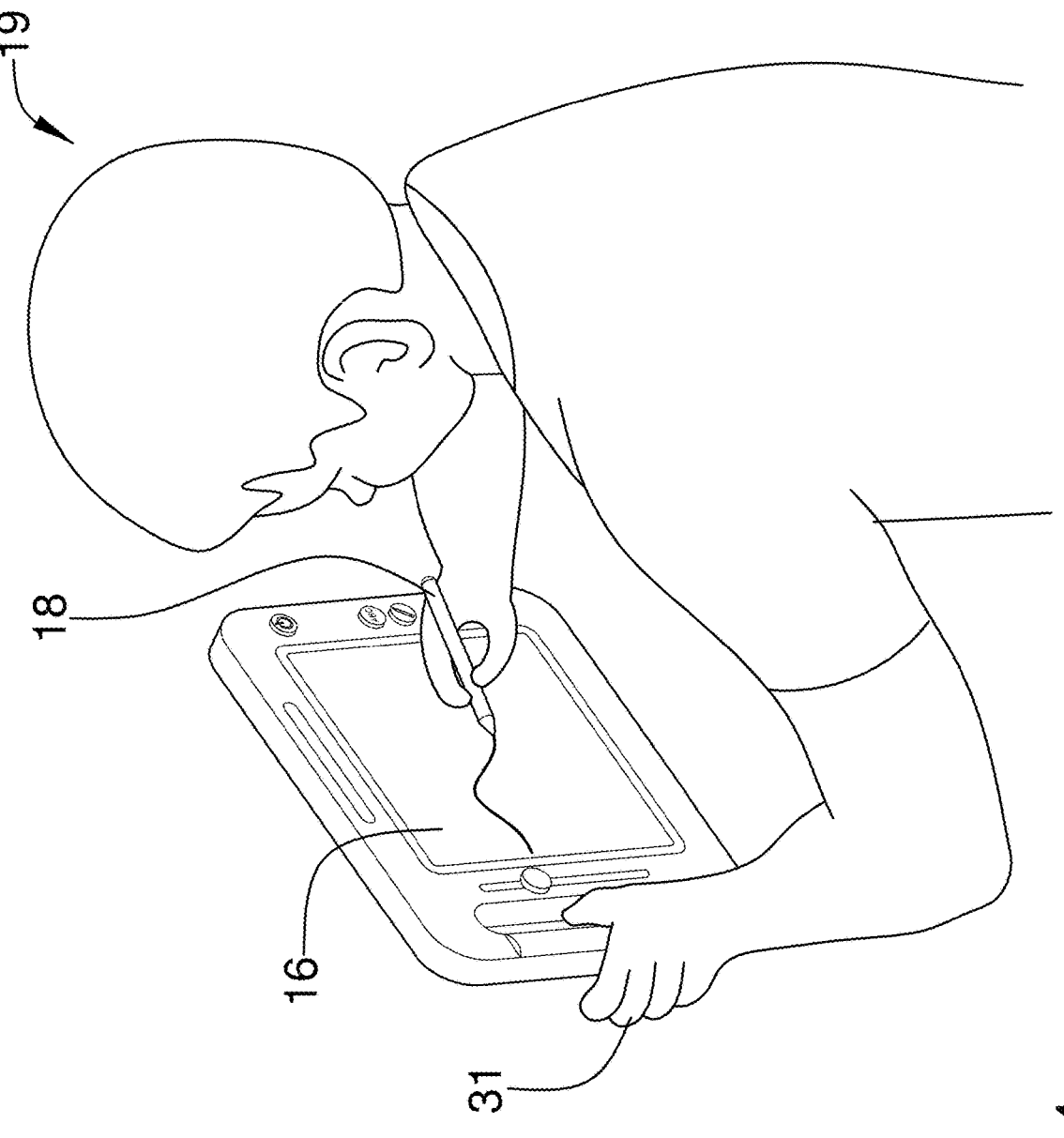
FIG. 4 is a perspective in-use view of an embodiment of the disclosure.
Figure 5:
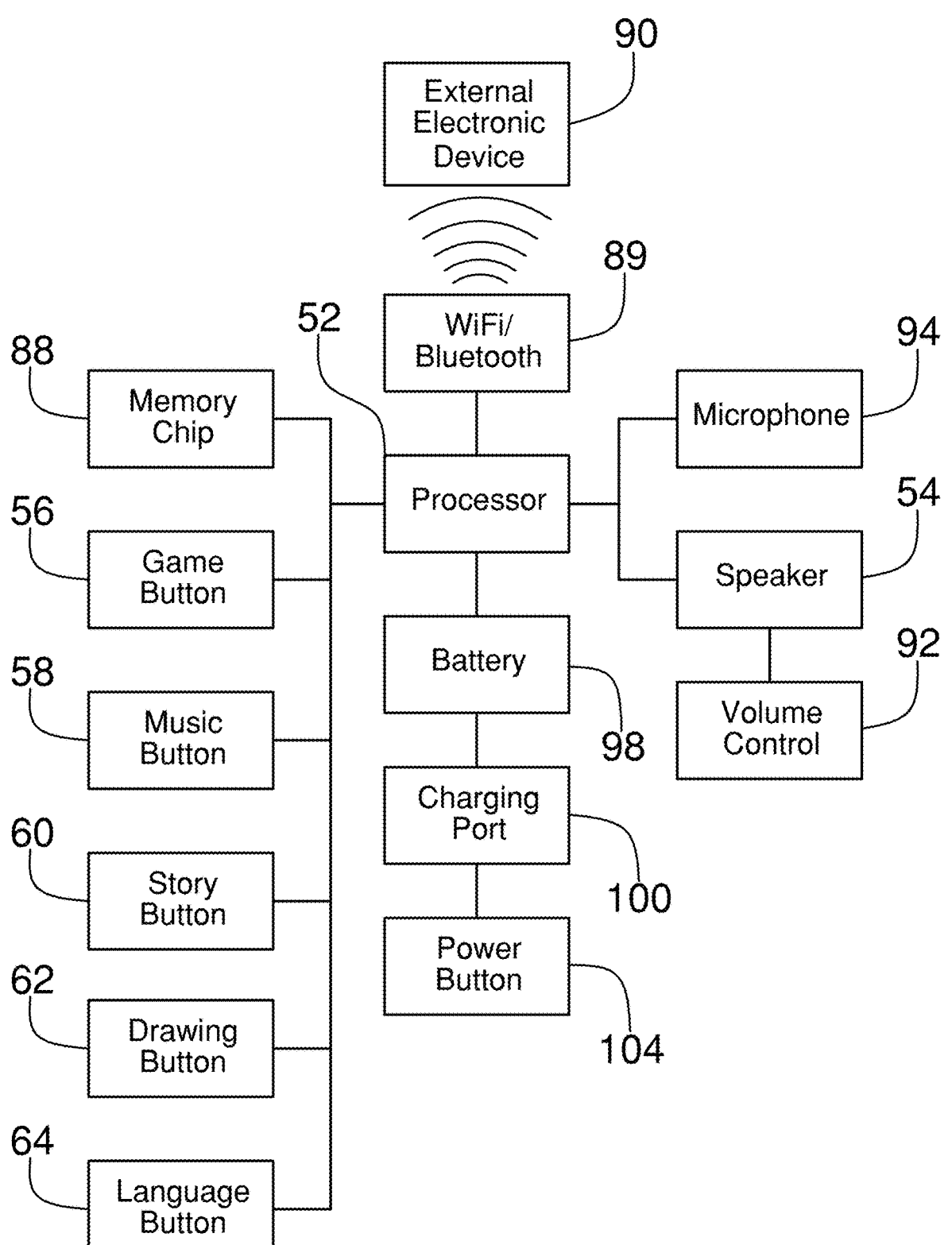
FIG. 5 is a schematic view of an embodiment of the disclosure.
Figure 6:
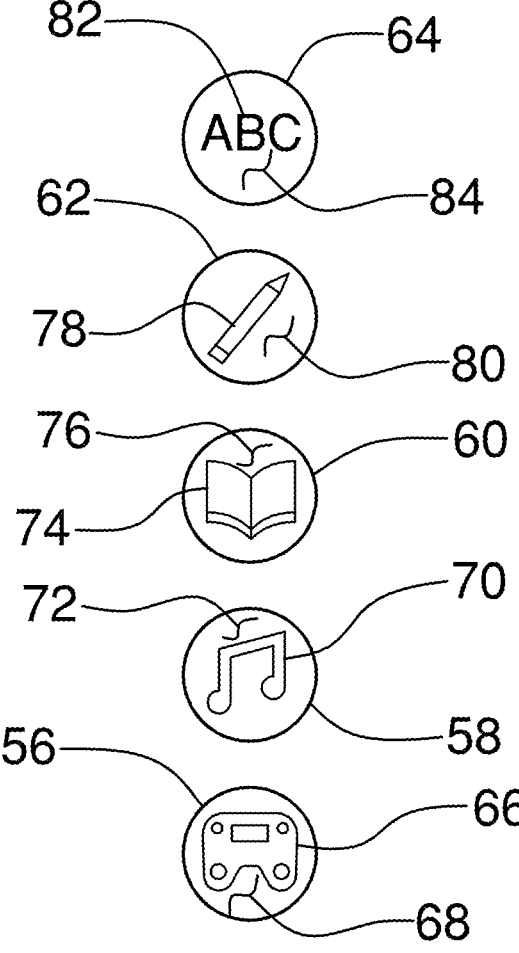
FIG. 6 is a magnified detail view taken from circle 6 of FIG. 2 of an embodiment of the disclosure.

With reference now to the drawings, and in particular to FIGS. 1 through 6 thereof, a new drawing pad device embodying the principles and concepts of an embodiment of the disclosure and generally designated by the reference numeral 10 will be described.

As best illustrated in FIGS. 1 through 6, the electronic education and drawing pad device 10 generally comprises a housing 14 and a touch screen display 16 which is integrated into the housing 14 and a stylus 18. The touch screen display 16 is responsive to contact with the stylus 18 thereby enabling the touch screen display 16 to display indicia which corresponds to a path that the stylus 18 traces on the touch screen display 16. In this way the touch screen display 16 enables a child 19 to create drawings on the touch screen display 16 with the stylus 18. The touch screen display 16 may comprise a light emitting diode display or other similar type of electronic display that is sensitive to touch and is capable of displaying color imagery.

The housing 14 has a first slot 20 which extends through a top wall 22 and a bottom wall 24 of the housing 14 at a point which is spaced from a first lateral side 26 of a perimeter wall 28 of the housing 14 to define a grip 30 which is positioned between the first slot 20 and the first lateral side 26 of the perimeter wall 28 of the housing 14. The grip 30 enables the child 19 to extend their fingers 31 through the first slot 20 for gripping the grip 30 to carry or position the housing 14. The first slot 20 is elongated along an axis extending between an upper side 32 and a lower side 34 of the perimeter wall 28 of the housing 14. The touch screen display 16 is disposed on the top wall 22 of the housing 14 such that the touch screen display 16 is visible to the child 19 when the bottom wall 24 of the housing 14 is lying on a support surface, such as a table top, for example, or other type of horizontal support surface. Additionally, the touch screen display 16 is positioned between the first slot 20 and a second lateral side 36 of the perimeter wall 28 of the housing 14. In this way the touch screen display 16 is accessible to the child 19 while the child 19 is gripping the housing 14 with the grip 30.

The housing 14 has a second slot 38 which extends through the top wall 22 of the housing 14. The second slot 38 is elongated along the axis extending between the upper side 32 and the lower side 34 of the perimeter wall 28. Additionally, the second slot 38 is positioned between the first slot 20 and the touch screen display 16. A cushion 40 extends around the grip 30 to permit an entirety of the child's fingers 31 to be positioned around the cushion 40 when the child 19 grips the grip. Furthermore, the cushion 40 is comprised of resiliently compressible material, including but not being limited to rubber or silicone, to enhance comfort for the child 19 when the child 19 is gripping the grip 30.

A retainer 42 is included which comprises a central section 44 coupled to the second lateral side 36 of the perimeter wall 28 of the housing 14 and pair of fingers 46 each being perpendicularly oriented with the central section 44 having the fingers 46 extending laterally away from the second lateral side 36. Each of the pair of fingers 46 has an inwardly facing surface 48 which is concavely arcuate thereby enabling the inwardly facing surface 48 of each of the pair of fingers 46 to conform to an outer surface 50 of the stylus 18 when the stylus 18 is positioned between the pair of fingers 46 for storing the stylus 18 on the housing 14. The fingers 46 are resiliently flexible to enable the fingers 46 to be spread way from each other when the stylus 18 is urged between the fingers 46 to enable the fingers 46 to frictionally engage the stylus 18 to retain the stylus 18 in the retainer 42.

A processor 52 is integrated into the housing 14 and the processor 52 is in operational communication with the touch screen display 16. A speaker 54 is integrated into the housing 14 and the speaker 54 emits audible sounds outwardly from the housing 14. A game button 56, a music button 58, a story button 60, a drawing button 62 and a language button 64 is each disposed on the housing 14. The game button 56 has game indica 66 applied to an exposed surface 68 of the game button 56 which comprises an image of a game controller. The music button 58 has music indicia 70 applied to an exposed surface 72 of the music button 58 which comprises an image of musical notation. The story button 60 has story indicia 74 applied to an exposed surface 76 of the story button 60 which comprises an image of a story book. The drawing button 62 has drawing indicia 78 applied to an exposed surface 80 of the drawing button 62 which comprises an image of a writing utensil. The language button 64 has language indicia 82 applied to an exposed surface 84 of the language button 64 comprising an image of letters. Furthermore, each of the game button 56, the music button 58, the story button 60, the drawing button 62 and the language button 64 are positioned between the touch screen display 16 and second lateral side 36 of the perimeter wall 28 of the housing 12.

The processor 52 is actuated into a game mode when the game button 56 is pressed having the touch screen display 16 displaying indicia comprising imagery associated with a game. In this way the processor 52 enables the child 19 to play the game on the touch screen display 16. The game might be an educational game, including but not being limited to a spelling game or a mathematics game, or the game may be a game purely for entertainment purposes. The processor 52 is actuated into a music mode when the music button 58 is pressed thereby enabling the speaker 54 to emit audible music. In this way the processor 52 enables the child 19 to listen to music played through the speaker 54. The processor 52 is actuated into a story mode when the story button 60 is pressed having the speaker 54 emitting spoken words of a story to enable the child 19 to listen to the story. Additionally, the processor 52 is actuated into a drawing mode when drawing button 62 is pressed thereby actuating the touch screen display 16 to respond to contact with the stylus 18. In this way the processor 52 enables the child 19 to create the drawings on the touch screen display 16 with the stylus 18. Furthermore, the processor 52 is actuated into a language mode when the language button 64 is pressed thereby enabling the speaker 54 to emit spoken words of a language. In this way the processor 52 enables the child 19 to learn a language other than their native language.

An electronic memory 88 is integrated into the housing 14 and the electronic memory 88 stores a game database which comprises the imagery associated with the game. The electronic memory 88 stores a music database which comprises music that might include well known popular songs, nursery rhymes, anthems or other types of music that is appropriate for children. Additionally, the electronic memory 88 stores a story database which comprises a plurality of stories that might include fables, popular children's stories or other types of stories that are appropriate for children. The electronic memory 88 stores a language database comprises a plurality of languages and educational instructions related to each of the plurality of languages. Furthermore, the plurality of languages may be any spoken language that is currently spoken by human beings.

The processor 86 is actuated into the game mode when the game button 56 is pressed and the touch screen display 16 is actuated to display the imagery associated with the game when the processor 86 receives the game mode. The processor 86 is actuated into the music mode when the music button 58 is pressed and the speaker 54 is actuated to audibly emit the music in the music database when the processor 86 receives the music mode. Continuing, the processor 86 is actuated into the story mode when the story button 60 is pressed and the speaker 54 is actuated to audibly emit one of the stories that are stored in the story database when the processor 86 receives the story mode. The processor 86 is actuated into the language mode when the language button 64 is pressed and the speaker 54 is actuated to audibly emit the educational instructions associated with one of the plurality of languages stored in the language database when the processor receives the language mode.

The processor 86 is actuated into the drawing mode when the drawing button 62 is pressed and the touch screen display 16 is actuated to be responsive to contact with the stylus 18 when the processor 86 receives the drawing mode. Furthermore, the electronic memory 88 stores the indicia displayed on the touch screen display 16 which corresponds to the path that the stylus 18 traces on the touch screen display 16 when the processor 86 receives the drawing mode. In this way the drawings created by the child 19 can be stored and subsequently downloaded for printing or the like. A transmitter 89 is included, which may comprise a radio frequency transmitter or the like and which may employ Bluetooth communication protocols, and which can be wirelessly synchronized with an external electronic device 90 to enable the drawings saved in the electronic memory 88 to be downloaded into the external electronic device 90 to be printed, for example, or otherwise reproduced.

A volume control 92 is slidably positioned in the second slot 38 and the volume control 92 can be manipulated by the child 19. The volume control 92 is in electrical communication with the processor 86 and the volume control 92 is slidable between a minimum position and a maximum position. Furthermore, the speaker 54 is actuated between a minimum intensity and a maximum intensity which corresponds to a positioning of the volume control 92 with respect to the minimum position and the maximum position. In this way the volume control 92 enables the child 19 to adjust a volume of the speaker 54.

A microphone 94 is integrated into the housing 14 thereby enabling the microphone 94 to detect audible sounds. The microphone 94 is in electrical communication with the processor 86 and the microphone 94 is actuated when the processor 86 receives the language mode. In this way the microphone 94 can detect words spoken by the child 19. Furthermore, the language database stored in the electronic memory 88 includes a language comparison which compares words detected by the microphone 94 against instructions in the language database. In this way the speaker 54 enables the child 19 to receive feedback and guidance with respect to learning to speak the language stored in the language database. Each of the speaker 54 and the microphone 94 is positioned between the touch screen display 16 and upper side 32 of the perimeter wall 28 of the housing 12. Additionally, an air permeable cover 95 is attached to the top wall 22 of the housing and the air permeable cover enables sound to pass through the air permeable cover 95. Furthermore, each of the speaker 54 and the microphone 94 are positioned beneath the air permeable cover 95.

A power supply 96 is integrated into the housing 14 and the power supply 96 is in electrical communication with the processor 86. The power supply 96 comprises a rechargeable battery 98 which is positioned within the housing 14 and the rechargeable battery 98 is in electrical communication with the processor 86. The power supply 96 includes a charge port 100 which is recessed into the perimeter wall 28 of the housing 14 to receive a charge cord 102 for charging the rechargeable battery 98. The power supply 96 includes a power button 104 which is movably integrated into the top wall 22 of the housing 14 and the power button 104 is in electrical communication with the processor 86. Furthermore, the power button 104 actuates the processor 86 when the power button 104 is pressed an initial time and the power button 104 de-actuates the processor 86 when the power button 104 is pressed a subsequent time.

In use, child 19 presses the drawing button 62 when the child 19 wishes to employ the stylus 18 to draw pictures on the touch screen display 16 which are automatically saved in the electronic memory 88 for subsequent download or to be displayed on the touch screen display 16 at a later time. The child 19 presses the game button 56 when the child 19 wishes to play games on the touch screen display 16 and the child 19 presses the music button 58 when the child 19 wishes to listen to music, songs of which can be chosen on a menu displayed on the touch screen display 16. The child 19 presses the story button 60 when the child 19 wishes to listen to one of a plurality of stories that are stored in the electronic memory 88 which can be selected on a menu that is displayed on the touch screen display 16. The child 19 presses the drawing button 62 when the child 19 wishes to employ the stylus 18 to draw pictures on the touch screen display 16 which are subsequently stored in the electronic memory 88. The child 19 presses the language button 64 when the child 19 wishes to practice speaking one of the plurality of languages that are stored in the electronic memory 88 to enable the child 19 to learn to speak one or more foreign languages.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electronic education and drawing pad device for enabling a child to create and subsequently save drawings and additionally engage in educational activities, said device comprising:

a housing;

a touch screen display being integrated into said housing;

a stylus, said touch screen display being responsive to contact with said stylus thereby enabling said touch screen display to display indicia which corresponds to a path that said stylus traces on said touch screen display wherein said touch screen display is configured to enable the child to create the drawings on said touch screen display with said stylus; and a processor being integrated into said housing, said processor being in operational communication with said touch screen display;

a speaker being integrated into said housing wherein said speaker is configured to emit audible sounds outwardly from said housing, said speaker being in operational communication with said processor;

a game button being disposed on said housing, said game button being in operational communication with said processor, said processor being actuated into a game mode when said game button is manipulated, said touch screen display being actuated to display imagery associated with said game when said processor is actuated into said game mode wherein said touch screen display is configured to enable the child to play a game on said touch screen display;

a music button being disposed on said housing, said music button being in operational communication with said processor, said processor being actuated into a music mode when said music button is manipulated, said speaker being actuated to audibly emit said music in a music database when said processor is actuated into said music mode wherein said speaker is configured to enable the child to listen to the music;

a story button being disposed on said housing, said story button being in operational communication with said processor, said processor being actuated into a story mode when said story button is manipulated, said speaker being actuated to audibly emit one of said stories stored in a story database when said processor is actuated into said story mode wherein said speaker is configured to enable the child to listen to the story;

a drawing button being disposed on said housing, said drawing button being in operational communication with said processor, said touch screen display being actuated to be responsive to contact with said stylus when said processor is actuated into a drawing mode; and a language button being disposed on said housing, said language button being in operational communication with said processor, said speaker being actuated to audibly emit one of a plurality of languages when said processor is actuated into a language mode wherein said speaker is configured to enable the child to learn the language.

2. The electronic education and drawing pad device according to claim 1, wherein:

said housing has a first slot extending through a top wall and a bottom wall of said housing at a point being spaced from a first lateral side of a perimeter wall of said housing to define a grip which is positioned between said first slot and said first lateral side of said perimeter wall of said housing wherein said grip is configured to enable the child to extend their fingers through said first slot for gripping said grip; and said first slot is elongated along an axis extending between an upper side and a lower side of said perimeter wall of said housing.

3. The electronic education and drawing pad device according to claim 2, wherein:

said touch screen display is disposed on said top wall of said housing wherein said touch screen display is configured to be visible to the child when said bottom wall of said housing is lying on a support surface; and said touch screen display is positioned between said first slot and a second lateral side of said perimeter wall of said housing wherein said touch screen display is configured to be accessible to the child while the child is gripping said housing with said grip.

4. The electronic education and drawing pad device according to claim 2, wherein:

said housing has a second slot extending through said top wall of said housing;

said second slot is elongated along said axis extending between said upper side and said lower side of said perimeter wall;

said second slot is positioned between said first slot and said touch screen display; and said volume control is slidably positioned in said second slot.

5. The electronic education and drawing pad device according to claim 2, wherein:

said electronic education and drawing pad device includes a cushion extending around said grip wherein said cushion is configured to permit an entirety of the child's fingers to be positioned around said cushion when the child grips said grip; and said cushion is comprised of resiliently compressible material wherein said cushion is configured to enhance comfort for the child when the child is gripping said grip.

6. The electronic education and drawing pad device according to claim 1, wherein:

said housing has a perimeter wall;

said perimeter wall has a first lateral side and a second lateral side;

said electronic education and drawing pad device includes a retainer comprising a central section being coupled to said second lateral side of said perimeter wall of said housing and pair of fingers each being perpendicularly oriented with said central section having said fingers extending laterally away from said second lateral side; and each of said pair of fingers has an inwardly facing surface being concavely arcuate thereby enabling said inwardly facing surface of each of said pair of fingers to conform to an outer surface of said stylus when said stylus is positioned between said pair of fingers for storing said stylus on said housing.

7. The electronic education and drawing pad device according to claim 1, wherein:

said electronic education and drawing pad device includes an electronic memory being positioned within said housing;

said electronic memory is in electrical communication with said processor;

said electronic memory stores a game database comprising said imagery associated with said game;

said electronic memory stores said music database comprising music;

said electronic memory stores said story database comprising a plurality of stories; and said electronic memory stores a language database comprising a plurality of languages and educational instructions related to each of said plurality of languages.

8. The electronic education and drawing pad device according to claim 7, wherein said touch screen display is actuated to display said imagery associated with said game in said game database when said processor is actuated into said game mode.

9. The electronic education and drawing pad device according to claim 7, wherein said speaker is actuated to audibly emit said music in said music database when said processor is actuated into said music mode.

10. The electronic education and drawing pad device according to claim 7, wherein said speaker is actuated to audibly emit one of said stories stored in said story database when said processor is actuated into said story mode.

11. The electronic education and drawing pad device according to claim 7, wherein said electronic memory stores said indicia displayed on said touch screen display which corresponds to said path that said stylus traces on said touch screen display when said processor is actuated into said drawing mode.

12. The electronic education and drawing pad device according to claim 7, wherein said speaker is actuated to audibly emit said educational instructions associated with one of said plurality of languages stored in said language database when said processor receives said language mode.

13. The electronic education and drawing pad device according to claim 7, wherein:

said electronic education and drawing pad device includes a microphone being integrated into said housing wherein said microphone is configured to detect audible sounds;

said microphone is in electrical communication with said processor; and said microphone is actuated when said processor is actuated into said language mode wherein said microphone is configured to detect words spoken by the child.

14. The electronic education and drawing pad device according to claim 13, wherein said language database stored in said electronic memory includes a language comparison which compares words detected by said microphone against instructions in said language database wherein said language speaker is configured to enable the child to receive feedback and guidance with respect to learning to speak the language stored in said language database.

15. The electronic education and drawing pad device according to claim 1, wherein:

said volume control is slidable between a minimum position and a maximum position;

said speaker is actuated between a minimum intensity and a maximum intensity which corresponds to a positioning of said volume control with respect to said minimum position and said maximum position wherein said volume control is configured to enable the child to adjust a volume of said speaker.

16. The electronic education and drawing pad device according to claim 1, wherein:

said processor includes a processor;

said processor includes a power supply being integrated into said housing;

said power supply is in electrical communication with said processor; and said power supply comprises:

a rechargeable battery being positioned within said housing, said rechargeable battery being in electrical communication with said processor;

a charge port being recessed into said perimeter wall of said housing wherein said charge port is configured to receive a charge cord for charging said rechargeable battery; and a power button being movably integrated into a top wall of said housing, said power button being in electrical communication with said processor, said power button actuating said processor when said power button is pressed an initial time, said power button de-actuating said processor when said power button is pressed a subsequent time.

17. An electronic education and drawing pad device for enabling a child to create and subsequently save drawings and additionally engage in educational activities, said device comprising:

a housing having a first slot extending through a top wall and a bottom wall of said housing at a point being spaced from a first lateral side of a perimeter wall of said housing to define a grip which is positioned between said first slot and said first lateral side of said perimeter wall of said housing wherein said grip is configured to enable the child to extend their fingers through said first slot for gripping said grip, said first slot being elongated along an axis extending between an upper side and a lower side of said perimeter wall of said housing;

a touch screen display being integrated into said housing, said touch screen display being disposed on said top wall of said housing wherein said touch screen display is configured to be visible to the child when said bottom wall of said housing is lying on a support surface, said touch screen display being positioned between said first slot and a second lateral side of said perimeter wall of said housing wherein said touch screen display is configured to be accessible to the child while the child is gripping said housing with said grip;

a stylus, said touch screen display being responsive to contact with said stylus thereby enabling said touch screen display to display indicia which corresponds to a path that said stylus traces on said touch screen display wherein said touch screen display is configured to enable the child to create the drawings on said touch screen display with said stylus;

a cushion extending around said grip wherein said cushion is configured to permit an entirety of the child's fingers to be positioned around said cushion when the child grips said grip, said cushion being comprised of resiliently compressible material wherein said cushion is configured to enhance comfort for the child when the child is gripping said grip;

a retainer comprising a central section being coupled to said second lateral side of said perimeter wall of said housing and pair of fingers each being perpendicularly oriented with said central section having said fingers extending laterally away from said second lateral side, each of said pair of fingers having an inwardly facing surface being concavely arcuate thereby enabling said inwardly facing surface of each of said pair of fingers to conform to an outer surface of said stylus when said stylus is positioned between said pair of fingers for storing said stylus on said housing; and a processor being integrated into said housing, said processor being in electrical communication with said touch screen display;

a speaker being integrated into said housing wherein said speaker is configured to emit audible sounds outwardly from said housing, said speaker being in electrical communication with said processor;

a game button being disposed on said housing, said game button being in electrical communication with said processor, said processor being actuated into a game mode when said game button is manipulated, said touch screen display being actuated to display imagery associated with said game when said processor is actuated into said game mode wherein said touch screen display is configured to enable the child to play a game on said touch screen display;

a music button being disposed on said housing, said music button being in electrical communication with said processor, said processor being actuated into a music mode when said music button is manipulated, said speaker being actuated to audibly emit said music in said a music database when said processor is actuated into said music mode wherein said speaker is configured to enable the child to listen to the music;

a story button being disposed on said housing, said story button being in electrical communication with said processor, said processor being actuated into a story mode when said story button is manipulated, said speaker being actuated to audibly emit one of said stories stored in a story database when said processor is actuated into said story mode wherein said speaker is configured to enable the child to listen to the story;

a drawing button being disposed on said housing, said drawing button being in electrical communication with said processor, said touch screen display being actuated to be responsive to contact with said stylus when said processor is actuated into a drawing mode;

a language button being disposed on said housing, said language button being in electrical communication with said processor, said speaker being actuated to audibly emit said educational instructions associated with one of a plurality of languages when said processor is actuated into a language mode wherein said speaker is configured to enable the child to learn the language;

an electronic memory being positioned within said housing, said electronic memory being in electrical communication with said processor, said electronic memory storing a game database comprising said imagery associated with said game, said electronic memory storing a music database comprising music, said electronic memory storing a story database comprising a plurality of stories, said electronic memory storing a language database comprising a plurality of languages and educational instructions related to each of said plurality of languages, said electronic memory storing said indicia displayed on said touch screen display which corresponds to said path that said stylus traces on said touch screen display when said processor is actuated into said drawing mode, said speaker being actuated to audibly emit said educational instructions associated with one of said plurality of languages stored in said language database when said processor is actuated into said language mode;

a volume control being slidably disposed on said housing, said volume control being in operational communication with said speaker for adjusting a volume of said speaker;

said housing having a second slot extending through said top wall of said housing, said second slot being elongated along said axis extending between said upper side and said lower side of said perimeter wall, said second slot being positioned between said first slot and said touch screen display, said volume control being slidably positioned in said second slot, said volume control being in electrical communication with said processor, said volume control being slidable between a minimum position and a maximum position, said speaker being actuated between a minimum intensity and a maximum intensity which corresponds to a positioning of said volume control with respect to said minimum position and said maximum position wherein said volume control is configured to enable the child to adjust a volume of said speaker;

a microphone being integrated into said housing wherein said microphone is configured to detect audible sounds, said microphone being in electrical communication with said processor, said microphone being actuated when said processor is actuated into said language mode wherein said microphone is configured to detect words spoken by the child, said language database stored in said electronic memory including a language comparison which compares words detected by said microphone against instructions in said language database wherein said microphone is configured to enable the child to receive feedback and guidance with respect to learning to speak the language stored in said language database; and a power supply being integrated into said housing, said power supply being in electrical communication with said processor, said power supply comprising:

a rechargeable battery being positioned within said housing, said rechargeable battery being in electrical communication with said processor;

a charge port being recessed into said perimeter wall of said housing wherein said charge port is configured to receive a charge cord for charging said rechargeable battery; and a power button being movably integrated into said top wall of said housing, said power button being in electrical communication with said processor, said power button actuating said processor when said power button is pressed an initial time, said power button de-actuating said processor when said power button is pressed a subsequent time.

\* \* \* \* \*